(12) United States Patent
Nemoto et al.

(10) Patent No.: US 10,139,775 B2
(45) Date of Patent: Nov. 27, 2018

(54) RETAINING MEMBER AND IMAGE FORMING APPARATUS INCLUDING SAME

(71) Applicant: KYOCERA Document Solutions Inc., Osaka (JP)

(72) Inventors: Shinji Nemoto, Osaka (JP); Naoto Miyakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/695,637

(22) Filed: Sep. 5, 2017

(65) Prior Publication Data
US 2018/0088517 A1   Mar. 29, 2018

(30) Foreign Application Priority Data

Sep. 27, 2016   (JP) .................................. 2016-187944

(51) Int. Cl.
*G03G 21/00*   (2006.01)
*F16C 35/00*   (2006.01)
(Continued)

(52) U.S. Cl.
CPC ....... *G03G 21/1647* (2013.01); *F16B 21/186* (2013.01); *F16C 35/063* (2013.01); *G03G 15/757* (2013.01); *F16C 2226/12* (2013.01); *F16C 2324/16* (2013.01); *G03G 2221/1654* (2013.01); *G03G 2221/1657* (2013.01)

(58) Field of Classification Search
CPC ............. G03G 15/757; G03G 15/5008; G03G 21/1647; G03G 2221/1657; F16C 35/063; F16C 35/073; F16C 35/06; F16C 2226/12; F16C 2324/16; F16B 21/16; F16B 21/18; F16B 21/186; F16B 21/20
USPC ........ 399/107, 167; 384/217, 418, 435, 510, 384/537, 539, 620, 903
See application file for complete search history.

(56) References Cited

U.S. PATENT DOCUMENTS 4,477,126 A * 10/1984 Price ...................... B65G 39/00
                                                          188/110
4,750,878 A *  6/1988 Nix ......................... B25B 27/28
                                                          384/295
(Continued)

FOREIGN PATENT DOCUMENTS

JP   2000-321836 A   11/2000

*Primary Examiner* — Robert Beatty
(74) *Attorney, Agent, or Firm* — Stein IP, LLC

(57) ABSTRACT

A retaining member is integrally formed of an elastically deformable material, and has an inner circumferential portion, an outer circumferential portion, a linkage portion, a plurality of engagement claws, and a slit. The inner and outer circumferential portions are ring-shaped, and the outer circumferential portion is disposed outside the inner circumferential portion in a radial direction. The linkage portion connects the inner circumferential portion and the outer circumferential portion to each other in the radial direction. The engagement claws project from a surface of the inner circumferential portion pointing in a direction of the shaft, and engage with an engagement groove formed in an outer peripheral surface of the shaft. The slit is formed on a side opposite from the linkage portion with a center of the inner circumferential portion located between the slit and the linkage portion, and cuts the inner circumferential portion in the radial direction.

10 Claims, 8 Drawing Sheets

(51) Int. Cl.
*F16B 21/00* (2006.01)
*G03G 21/16* (2006.01)
*F16C 35/063* (2006.01)
*F16B 21/18* (2006.01)
*G03G 15/00* (2006.01)

(56) References Cited

U.S. PATENT DOCUMENTS

| | | | | |
|---|---|---|---|---|
| 6,116,809 | A | * | 9/2000 | Raszkowski ............ F16B 21/18 403/316 |
| 6,276,832 | B1 | * | 8/2001 | Wade, III .............. F16C 23/045 384/204 |
| 6,918,728 | B1 | * | 7/2005 | Frauhammer ........... F16B 21/18 411/518 |
| 7,558,518 | B2 | * | 7/2009 | Fujimoto ........... G03G 15/2053 219/216 |
| 2001/0014264 | A1 | * | 8/2001 | Wolfe .................. F16B 21/186 411/526 |
| 2011/0283491 | A1 | * | 11/2011 | Ainslie ................ F16B 21/186 24/530 |
| 2013/0164052 | A1 | * | 6/2013 | Okamoto ................ F16C 13/00 399/313 |

\* cited by examiner

RETAINING MEMBER AND IMAGE FORMING APPARATUS INCLUDING SAME

INCORPORATION BY REFERENCE

This application is based upon and claims the benefit of priority from the corresponding Japanese Patent Application No. 2016-187944 filed on Sep. 27, 2016, the entire contents of which are incorporated herein by reference.

BACKGROUND

The present disclosure relates to a retaining member for preventing a roller and a shaft constituting a drive unit and a gear mounted around such a roller and a shaft from coming off, and an image forming apparatus, such as a copier, a printer, a facsimile machine, and a multifunction peripheral having functions of these, which is provided with such a retaining member.

In conventional image forming apparatuses, such as copiers and printers, a drive transmission mechanism composed of a gear, a shaft, and the like for transmitting a rotational driving force of a drive unit is used to transmit the rotational driving force to rotary bodies such as a photosensitive drum, a developing roller, and the like as driven members. In such a drive transmission mechanism, as a method to prevent a roller, a shaft, and a gear mounted around these from coming off, there has been used a method in which a retaining ring such as an E-ring is mounted around a shaft.

As for image forming apparatuses, there has been an increasing demand for compactness, and this demand puts a strict restriction on the design of the drive transmission mechanism in terms of space. In the method where the conventional retaining member such as an E-ring is used, it is necessary to mount the retaining member from a radial direction of a roller or a shaft, and this disadvantageously requires a space in the radial direction for the mounting, and makes attaching/detaching operations disadvantageously complicated. Furthermore, end parts of the roller or the shaft are exposed, and this disadvantageously allows bearing grease to leak from the end parts.

There is also known a gear retaining structure in which a gear is mounted on a fixed shaft standing on a plate-shaped member made of resin, and an elastically deformable claw-shaped projection is provided projecting from the plate-shaped member, such that a hooked portion of the claw-shaped projection engages with a peripheral edge part of the gear mounted on the fixed shaft.

SUMMARY

According to one aspect of the present disclosure, a retaining member is integrally formed of an elastically deformable material, is mounted on an end part of a shaft supported by a holding member, and prevents the shaft from coming off from the holding member or prevents a rotary body mounted around the shaft from coming off. The retaining member has an inner circumferential portion, an outer circumferential portion, a linkage portion, a plurality of engagement claws, and a slit. The inner and outer circumferential portions are ring-shaped, and the outer circumferential portion is arranged outside the inner circumferential portion in a radial direction. The linkage portion connects the inner circumferential portion and the outer circumferential portion to each other in the radial direction. The plurality of engagement claws project from a surface of the inner circumferential portion pointing in a direction of the shaft, and engage with an engagement groove formed in an outer peripheral surface of the shaft. The slit is formed on a side opposite from the linkage portion with a center of the inner circumferential portion located between the slit and the linkage portion, and the slit cuts the inner circumferential portion in the radial direction.

Further features and specific advantages of the present disclosure will become apparent from the following descriptions of preferred embodiments.

DETAILED DESCRIPTION

Figure 1:
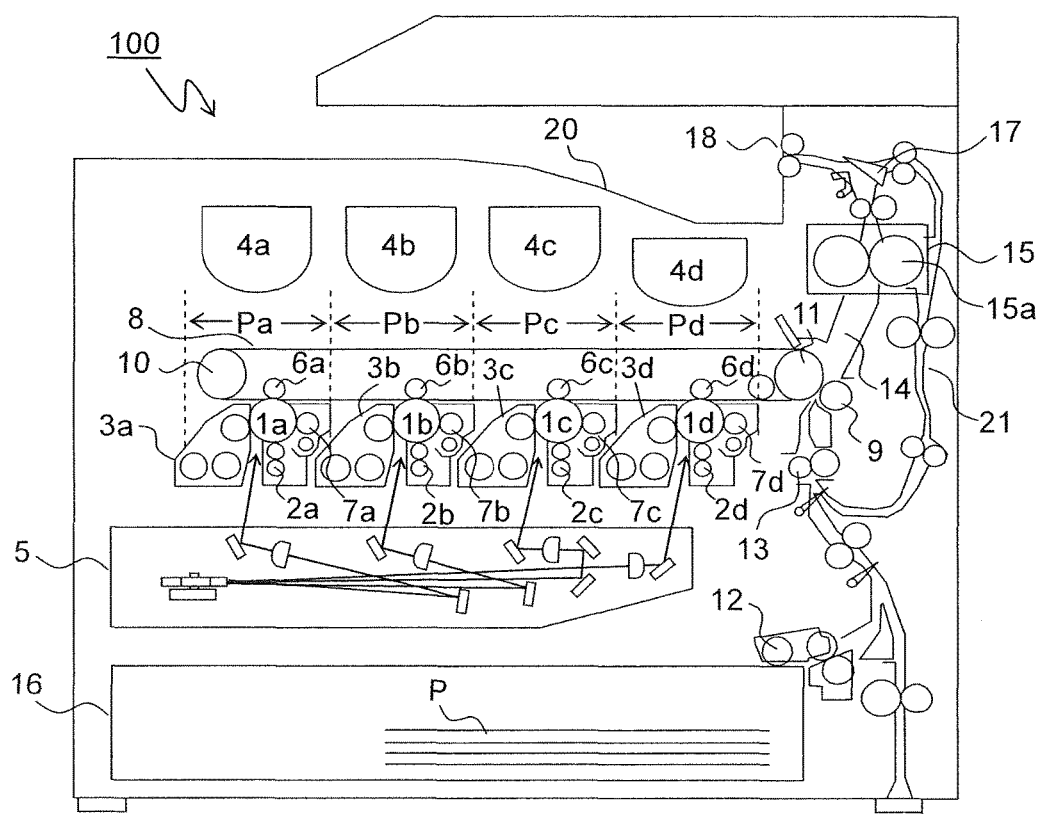
FIG. 1 is a schematic sectional view showing an overall configuration of a color printer including a retaining member of the present disclosure.

Hereinafter, embodiments of the present disclosure will be described with reference to the drawings. FIG. 1 is a schematic sectional view of an image forming apparatus provided with a retaining member 41 of the present disclosure, and the image forming apparatus shown herein is a tandem-type color printer. In a main body of a color printer 100, four image forming portions Pa, Pb, Pc, and Pd are arranged in this order from an upstream side in a sheet conveyance direction (left side in FIG. 1). The image forming portions Pa to Pd are provided corresponding to images of four different colors (cyan, magenta, yellow, and black), and sequentially form images of cyan, magenta, yellow, and black through charging, exposure, developing, and transfer processes.

These image forming portions Pa, Pb, Pc, and Pd are provided with photosensitive drums 1a, 1b, 1c, and 1d, respectively, which each carry a visible image (toner image) of a corresponding color, and further, an intermediate transfer belt 8 that rotates in a counterclockwise direction in FIG. 1 is provided adjacent to the image forming portions Pa to Pd.

When image data is inputted from a host device such as a personal computer, first, chargers 2a to 2d charge surfaces of the photosensitive drums 1a to 1d uniformly. Then, an exposure device 5 irradiates the photosensitive drums 1a to 1d with light in accordance with the image data, to thereby form an electrostatic latent image on each of the photosensitive drums 1a to 1d in accordance with the image data. Developing devices 3a to 3d are each filled, by toner containers 4a to 4d, with a predetermined amount of a two-component developer (which hereinafter may be referred to simply as a developer) containing a toner of a corresponding one of the four colors of cyan, magenta, yellow and black, and toners contained in the developers are supplied by the developing devices 3a to 3d, and electrostatically adhere, to the photosensitive drums 1a to 1d. Thereby, toner images are formed corresponding to the electrostatic latent images formed by the exposure to the light from the exposure device 5.

Then, by primary transfer rollers 6a to 6d, an electric field is applied at a predetermined transfer voltage between the primary transfer rollers 6a to 6d and the photosensitive drums 1a to 1d, and the toner images of cyan, magenta, yellow, and black on the photosensitive drums 1a to 1d are primarily transferred onto the intermediate transfer belt 8. After the primary transfer of the toner images, residual toner and the like left on the surface of each of the photosensitive drums 1a to 1d is removed by the cleaning devices 7a to 7d.

A transfer sheet P onto which the toner images are to be transferred is accommodated in a paper cassette 16 disposed in a lower part inside the color printer 100, and is conveyed at a predetermined timing via a sheet feeding roller 12 and a registration roller pair 13 to a nip portion (secondary transfer nip portion) between the intermediate transfer belt 8 and a secondary transfer roller 9 provided adjacent to the intermediate transfer belt 8. The transfer sheet P onto which the toner images have been transferred is conveyed through a sheet conveyance path 14 to a fixing portion 15.

The transfer sheet P which has been conveyed to the fixing portion 15 is heated and pressurized by a fixing roller pair 15a, whereby the toner images are fixed on a surface of the transfer sheet P, and thereby a predetermined full-color image is formed. The transfer sheet P, on which the full-color image has been formed, is discharged onto a discharge tray 20 by a discharge roller pair 18 as it is (or after being directed by a branching portion 17 into a reverse sheet conveyance path 21 and having an image formed on the other side).

Figure 2:
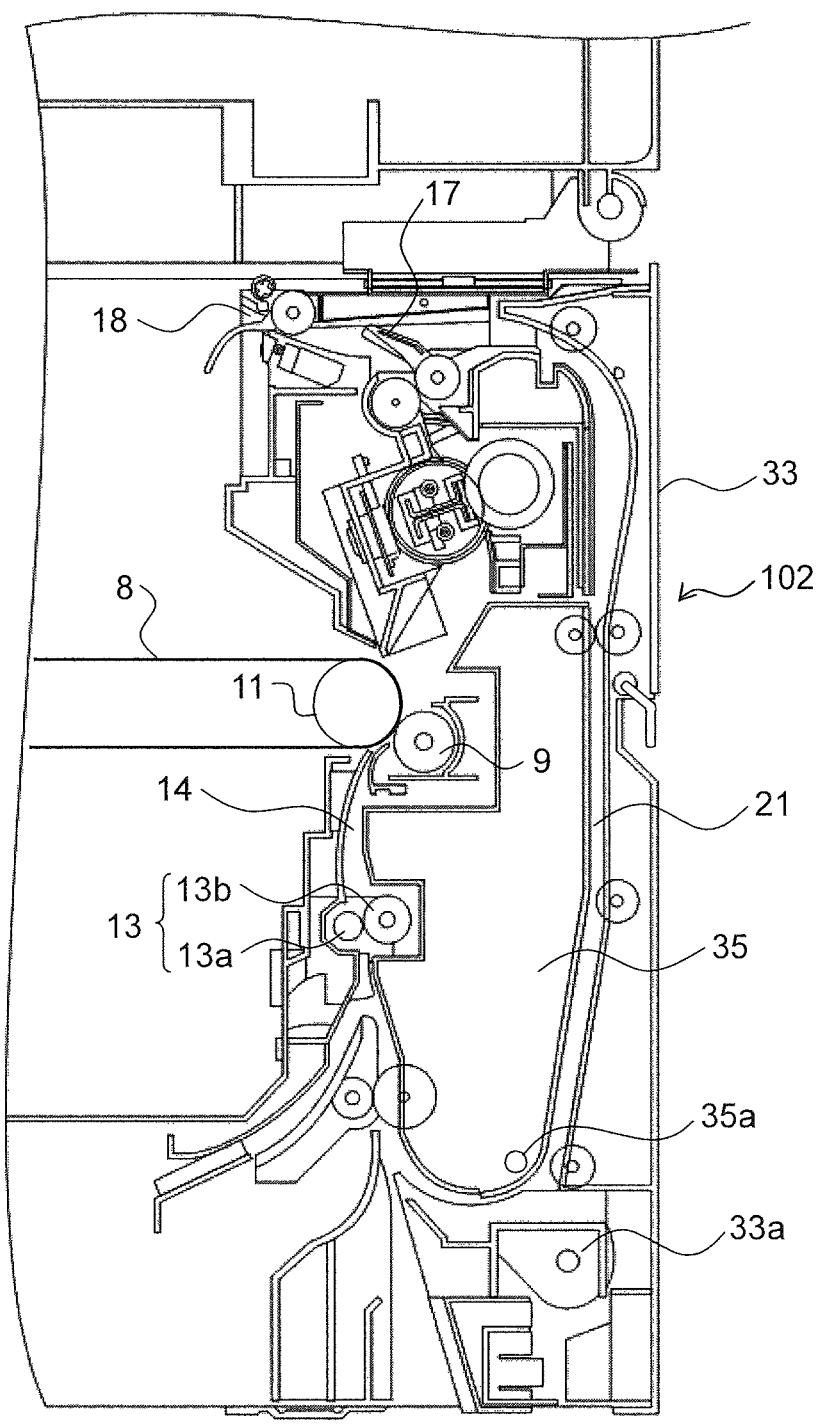
FIG. 2 is a sectional view of an area around a sheet conveyance path and a reverse sheet conveyance path in the color printer shown in FIG. 1.

FIG. 2 is a sectional view of an area around the sheet conveyance path 14 and the reverse sheet conveyance path 21 in the color printer 100 shown in FIG. 1. A side cover 33 constitutes a side face 102 of the color printer 100, and is rotatably supported by a pivot 33a provided in a lower part of the main body of the color printer 100. An inner surface of the side cover 33 constitutes one conveyance surface of the reverse sheet conveyance path 21, and a conveyance unit 35 is disposed inside the side cover 33. The conveyance unit 35 is supported in the main body of the color printer 100 to be rotatable about a pivot shaft 35a, and constitutes part of conveyance surfaces of the reverse sheet conveyance path 21 and the sheet conveyance path 14.

The reverse sheet conveyance path 21 extends in an up-down direction along the side face 102 of the color printer 100 between the side cover 33 and the conveyance unit 35, and is curved into a substantially C-shape to join the sheet conveyance path 14. On an inner surface (a left-side surface of the conveyance unit 35 in FIG. 2) of the conveyance unit 35, there are provided a roller 13b, which is one of rollers constituting the registration roller pair 13, and the secondary transfer roller 9 arranged in this order from an upstream side in the sheet conveyance direction (lower side in FIG. 2). The secondary transfer roller 9 presses a drive roller 11 with the intermediate transfer belt 8 located therebetween.

By rotating the side cover 33 alone in an opening direction with respect to the color printer 100, the reverse sheet conveyance path 21 is widely exposed. By rotating the side cover 33 together with the conveyance unit 35, the conveyance unit 35 is separated from a color-printer-100-main-body side and the sheet conveyance path 14 is widely exposed. On the other hand, by rotating the side cover 33 together with the conveyance unit 35 in a closing direction, the conveyance unit 35 comes into abutment with the color-printer-100-main-body side, and the secondary transfer roller 9 is pressed against the drive roller 11 with the intermediate transfer belt 8 located therebetween.

Figure 3:
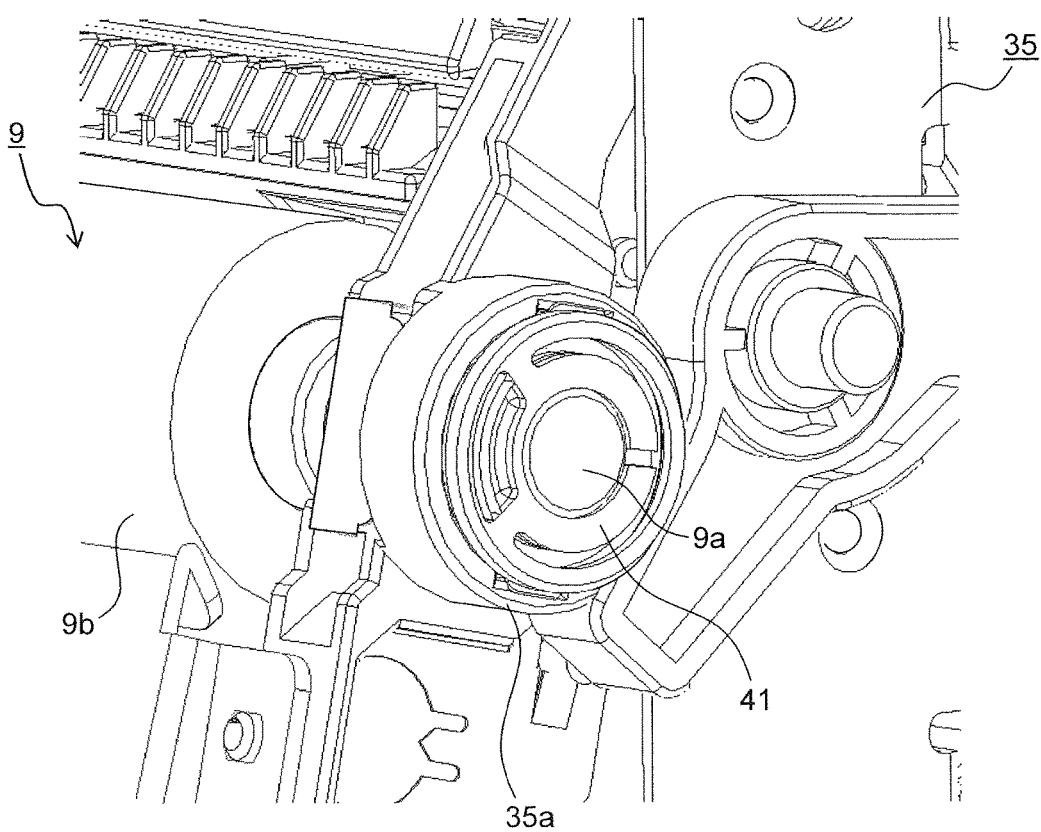
FIG. 3 is an enlarged perspective view of one end side (near side in FIG. 1) of a secondary transfer roller.

FIG. 3 is an enlarged perspective view of one end side (near side in FIG. 1) of the secondary transfer roller 9. The secondary transfer roller 9 is composed of a rotation shaft 9a, which is made of metal, and a roller body 9b, which is made of rubber on an outer peripheral surface of the rotation shaft 9a, and one end part of the rotation shaft 9a is inserted through a bearing member 40 (see FIG. 7) disposed in a housing 35a of the conveyance unit 35. The bearing member 40 is, for example, a rolling bearing (bearing) having balls or rollers therein. Although not illustrated here, the other end part (far side in FIG. 1) of the rotation shaft 9a is also rotatably supported by a bearing member 40. Further, a retaining member 41 is mounted on an end surface of the rotation shaft 9a.

Figure 4:
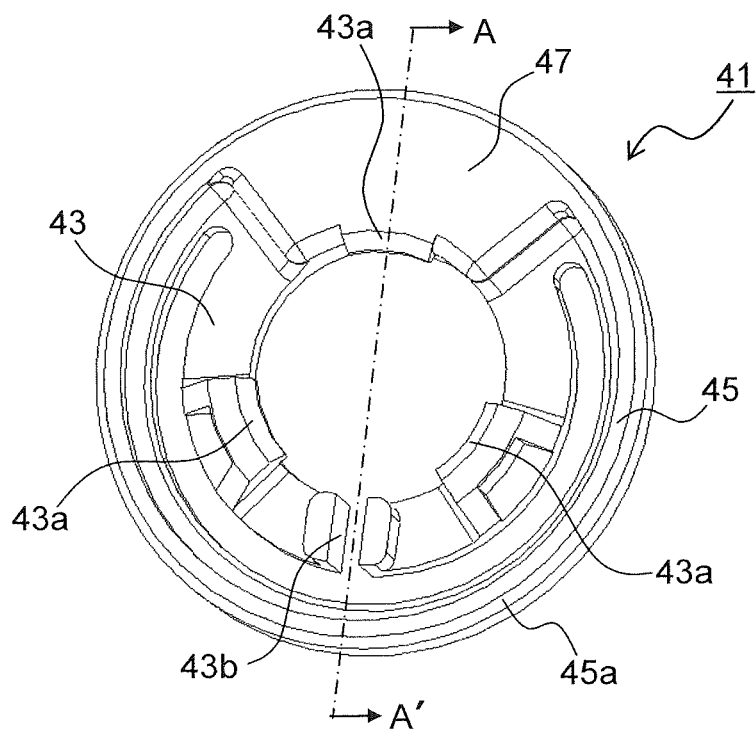
FIG. 4 is a perspective view of a retaining member according to a first embodiment of the present disclosure to be mounted on one end of the secondary transfer roller, as seen from a side where a surface of the retaining member pointing in a direction of a rotation shaft is located.
Figure 5:
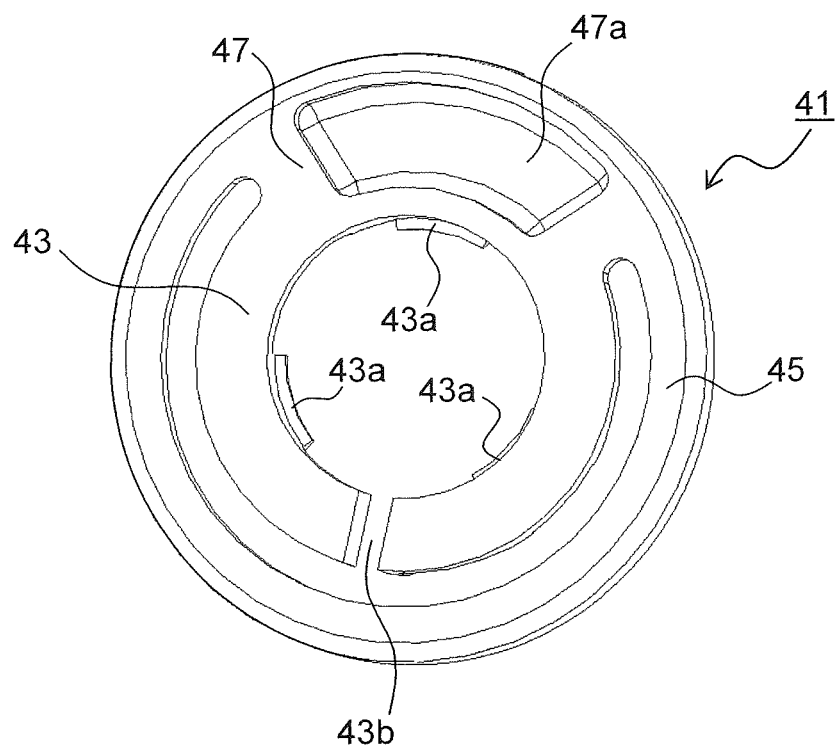
FIG. 5 is a perspective view of the retaining member of the first embodiment, as seen from a side opposite to the side where the surface of the retaining member pointing in the direction of the rotation shaft is located.
Figure 6:
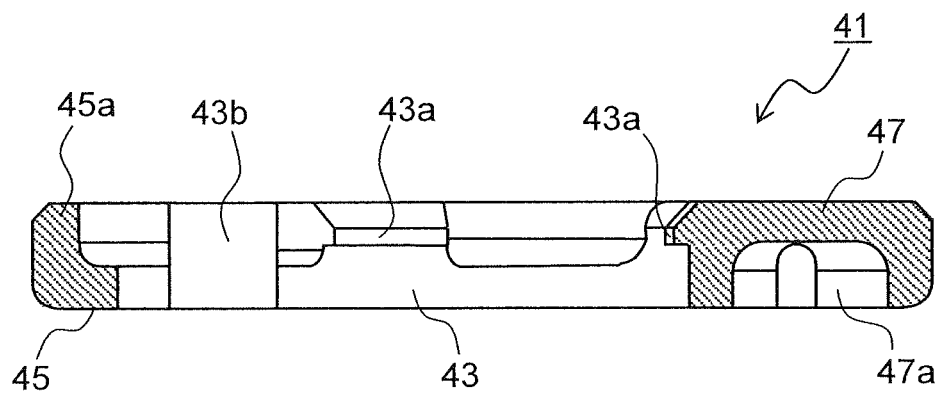
FIG. 6 is a sectional view cutting the retaining member along its radial direction.

FIG. 4 and FIG. 5 are perspective views of a retaining member 41 according to a first embodiment of the present disclosure mounted on one end of the secondary transfer roller 9, the former being as seen from a side where a surface of the retaining member 41 pointing in a direction of the rotation shaft 9a is located, and the latter being as seen from a side opposite to the side where the surface pointing in a direction of the rotation shaft 9a is located. FIG. 6 is a sectional view cutting the retaining member 41 of the first embodiment along the radial direction (along line AA' in FIG. 4). The retaining member 41 is a member which prevents the rotation shaft 9a from coming off from the housing 35a, and it is integrally formed of an ABS resin. It should be noted that the material of the retaining member 41 is not limited to an ABS resin, but can also be any elastically deformable material such as other synthetic resins, hard rubber, etc.

The retaining member 41 has an inner circumferential portion 43 and an outer circumferential portion 45, which are both ring-shaped, and a linkage portion, which connects the inner circumferential portion 43 and the outer circumferential portion 45 to each other in the radial direction. In the inner circumferential portion 43, engagement claws 43a are formed on a surface of the inner circumferential portion 43 pointing in a direction of the rotation shaft 9a. The engagement claws 43a are formed at three positions equally spaced from each other along a circumferential direction of the inner circumferential portion 43, leading ends of the engagement claws 43a projecting inward in the radial direction of the inner circumferential portion 43. Furthermore, a slit 43b is formed on a side opposite from the linkage portion 47 with a center of the inner circumferential portion 43 located between the slit 43b and the linkage portion 47, the slit 43b cutting the inner circumferential portion 43 in the radial direction. It should be noted that the engagement claws 43a may be formed at two positions or at four or more positions along the circumferential direction of the inner circumferential portion 43, and further, the engagement claws 43a do not need to be equally spaced from each other.

The outer circumferential portion 45 has a diameter that is substantially as large as an outer diameter of the bearing member 40 through which the rotation shaft 9a is inserted. In the outer circumferential portion 45, along an outer peripheral edge of the outer circumferential portion 45, there is formed a rib 45a projecting in a ring shape from a surface of the outer circumferential portion 45 pointing in a direction of the rotation shaft 9a. In the linkage portion 47, a fan-shaped recessed portion 47a is formed in a surface opposite to a surface of the linkage portion 47 pointing in a direction of the rotation shaft 9a.

Figure 7:
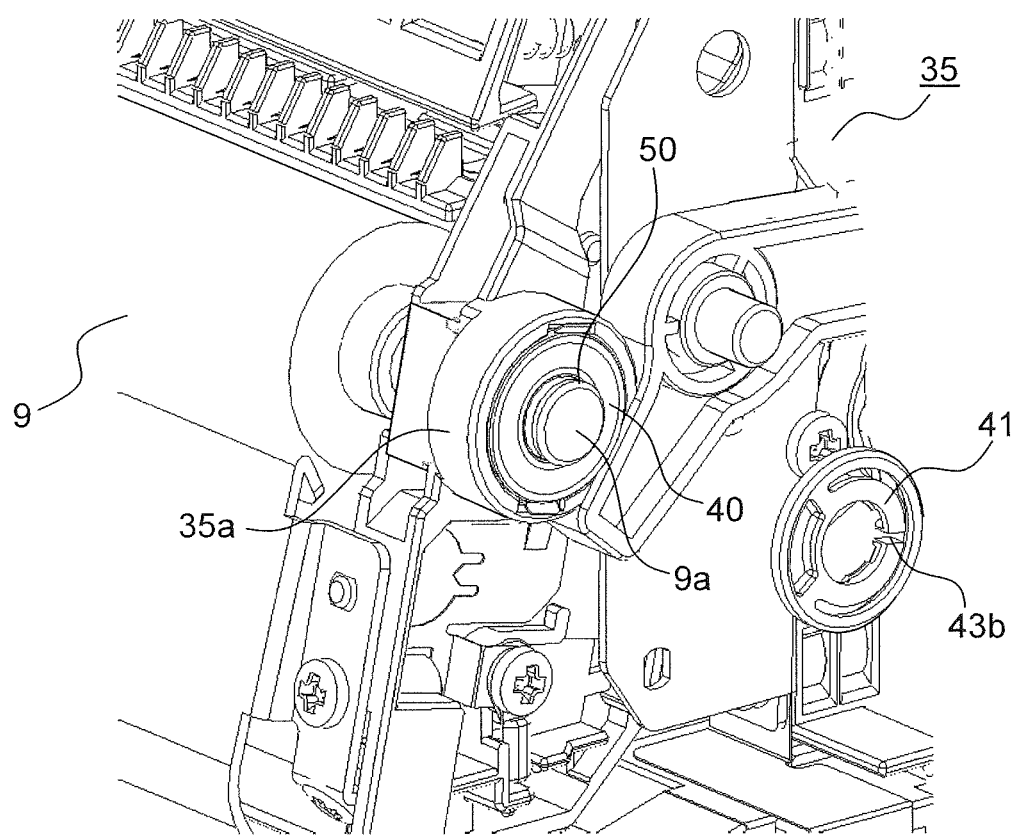
FIG. 7 is a perspective view showing how the retaining member of the first embodiment is mounted on one end of the rotation shaft of the secondary transfer roller.
Figure 8:
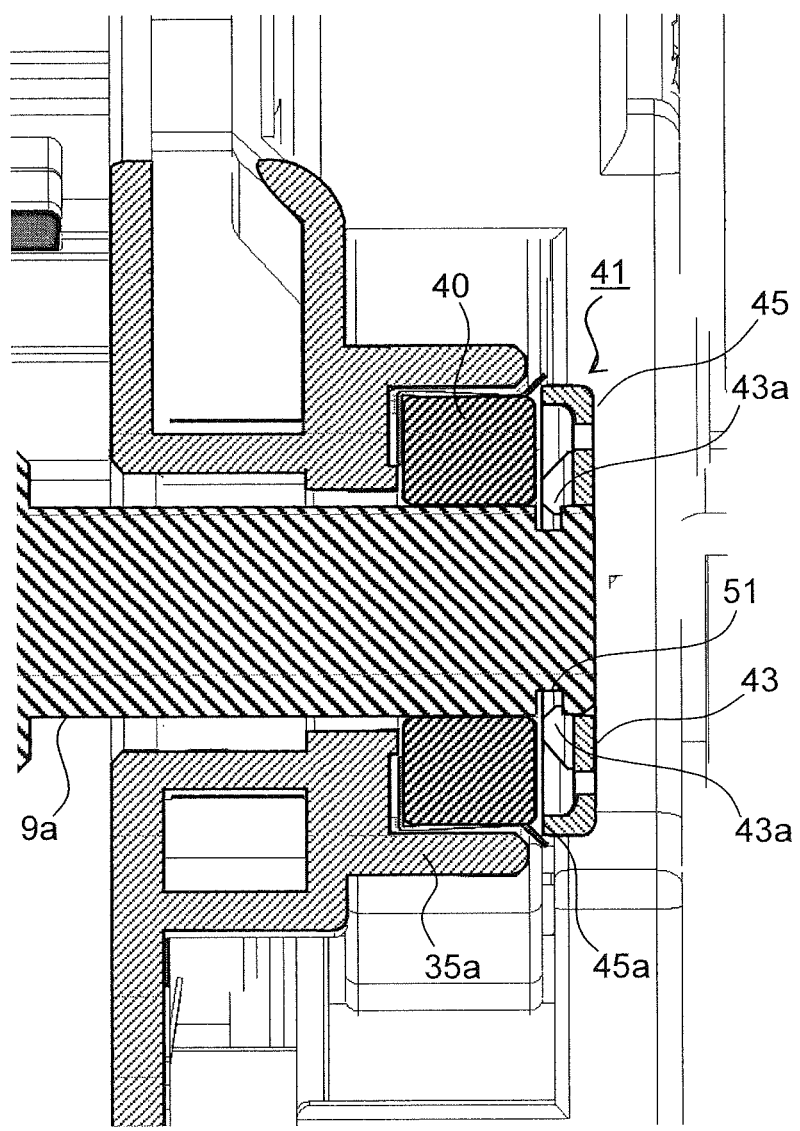
FIG. 8 is a partial sectional view cutting, along its axial direction, the one end of the rotation shaft on which the retaining member of the first embodiment is mounted.

FIG. 7 is a perspective view showing how the retaining member 41 of the first embodiment is mounted on one end of the rotation shaft 9a of the secondary transfer roller 9, and FIG. 8 is a partial sectional view cutting, in an axial direction, the one end of the rotation shaft 9a on which the retaining member 41 of the first embodiment is mounted. With reference to FIG. 7 and FIG. 8, a description will be given of how the retaining member 41 is mounted with respect to the rotation shaft 9a. First, the rotation shaft 9a of the secondary transfer roller 9 is inserted through the bearing member 40 disposed in the housing 35a. Then, the retaining member 41 is pushed in the axial direction toward a surface of a tip end of the rotation shaft 9a. Here, in a state where no external force is applied to the inner circumferential portion 43, a diameter of a circle which passes through leading ends of the engagement claws 41a of the retaining member 41 is smaller than an outer diameter of the rotation shaft 9a, and thus the engagement claws 43a come into contact with a peripheral edge part of the tip end of the rotation shaft 9a when the retaining member 41 is pushed.

The contact between the engagement claws 43a and the rotary shaft 9a causes a force to act on the inner circumferential portion 43 to externally expand from inside to outside in the radial direction. As a result, the inner circumferential portion 43 is elastically deformed to cause the slit 43b to become wide open, and the engagement claws 43a are pushed in the axial direction of the rotation shaft 9a while simultaneously being withdrawn outward in the radial direction. Besides, the rotation shaft 9a has a chamfered portion 50 formed on the peripheral edge part of the surface of its tip end, and thus, the engagement claws 43a are pushed along a slope of the chamfered portion 50 in the axial direction of the rotation shaft 9a. Then, when the retaining member 41 is pushed by a predetermined amount and the engagement claws 43a reach an engagement groove 51, which is formed in the outer peripheral surface of the rotation shaft 9a, the inner circumferential portion 43 is caused by its recovery force to shrink inward in the radial direction to cause the engagement claws 43a to engage in the engagement groove 51, and this completes the mounting of the retaining member 41 on the rotation shaft 9a.

Figure 9:
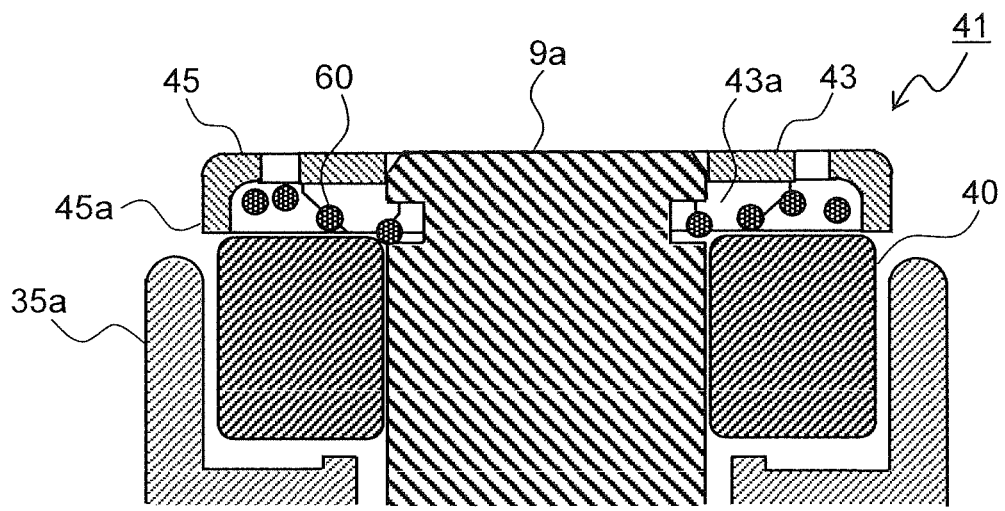
FIG. 9 is an enlarged view of an area near a tip end of the rotation shaft shown in FIG. 8.

FIG. 9 is an enlarged view of an area near the tip end of the rotation shaft 9a shown in FIG. 8. As shown in FIG. 9, when the retaining member 41 is mounted on the tip end of the rotation shaft 9a, the rib 45a of the outer circumferential portion 45 is in contact with an outer peripheral edge of the bearing member 40. As a result, an end surface of the bearing member 40 is covered by the retaining member 41, and this makes it possible to reduce leakage of grease (lubricating oil) 60 applied between the bearing member 40 and the rotation shaft 9a.

Note that the retaining member 41 has an arc-shaped gap between the inner circumferential portion 43 and the outer circumferential portion 45, and that the slit 43b is formed in the inner circumferential portion 43. Hence, the retaining member 41 does not completely seal a space that includes the end surface of the bearing member 40. However, the grease 60 has a relatively high viscosity (gel), and thus it is possible to effectively reduce leakage of the grease 60 by means of the retaining member 41 of the present embodiment.

To remove the retaining member 41 from the rotation shaft 9a, first, a finger is put in the recessed portion 47a formed in the linkage portion 47, and the retaining member 41 is pulled outward in the radial direction. As a result, the inner circumferential portion 43 is elastically deformed to cause the slit 43b to become wide open, and the engagement claws 43a are withdrawn outward in the radial direction, as a result of which the engagement between the engagement claws 43a and the engagement groove 51 becomes shallow. Then, by pulling out the retaining member 41 in this state in the axial direction, the retaining member 41 can be easily removed.

According to the configuration of the present embodiment, the retaining member 41 can be easily mounted on the rotation shaft 9a by pushing it in the axial direction of the rotation shaft 9a, and can be easily removed from the rotation shaft 9a by pulling it in the axial direction of the rotation shaft 9a. Accordingly, there is no need of preparing a dedicated space in the radial direction for the detachment/attachment of the retaining member 41, and thus, it is possible to save space without spoiling the ease of assembly.

Furthermore, since the end surface of the bearing member 40 is covered by the retaining member 41 in a state where the retaining member 41 is mounted on the rotation shaft 9a, it is possible to reduce leakage of the grease 60 from the bearing member 40. Accordingly, even when the user touches a member that he or she can touch in a state where the side cover 33 is open, such as the secondary transfer roller 9, there is no risk of the user having his or her finger stained due to leakage of the grease 60.

Figure 10:
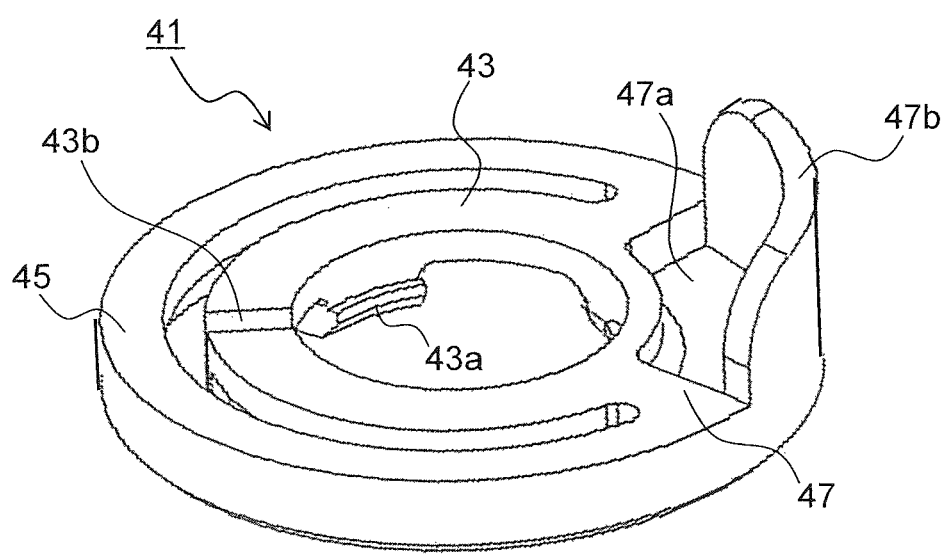
FIG. 10 is a perspective view of a retaining member according to a second embodiment of the present disclosure, as seen from a side opposite to a side where a surface of the retaining member pointing in a direction of a rotation shaft is located.
Figure 11:
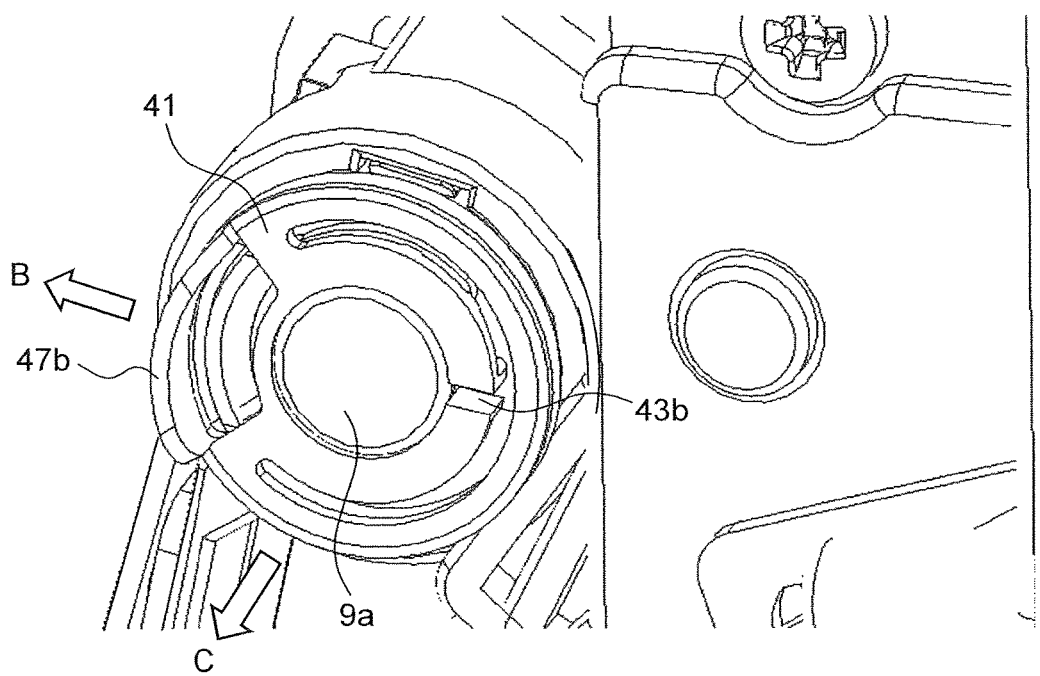
FIG. 11 is a perspective view showing a state in which the retaining member of the second embodiment is mounted on the rotation shaft.

FIG. 10 is a perspective view of a retaining member 41 according to a second embodiment of the present disclosure, as seen from a side opposite to a side where a surface of the retaining member 41 pointing in a direction of the rotation shaft 9a is located, and FIG. 11 is a perspective view showing a state in which the retaining member 41 of the second embodiment is mounted on the rotation shaft 9a. The retaining member 41 of the present embodiment includes a handle portion 47b, which is formed to project from a peripheral edge part of the linkage portion 47 toward the side opposite to the side where the surface of the retaining member 41 pointing in a direction of the rotation shaft 9a is located. The configurations of the other portions of the retaining member 41 of the present embodiment are similar to those in the first embodiment.

To remove the retaining member 41 of the present embodiment from the rotation shaft 9a, first, the handle portion 47b is held to pull the retaining member 41 outward in the radial direction (an arrow B direction in FIG. 11). As a result, the inner circumferential portion 43 is elastically deformed to cause the slit 43b to become wide open, and the engagement claws 43a are withdrawn outward in the radial direction, as a result of which the engagement between the engagement claws 43a and the engagement groove 51 becomes shallow. Then, by pulling out the retaining member 41 in this state in the axial direction (an arrow C direction in FIG. 11), the retaining member 41 can be easily removed. Thus, operability in removing the retaining member 41 is improved.

It should be understood that the present disclosure is not limited to the above embodiments, and various modifications are possible within the scope of the present disclosure. For example, the above embodiments have dealt with cases where the retaining member 41 is mounted on the rotation shaft 9a of the secondary transfer roller 9, but the present disclosure is not limited to this, and the retaining member 41 is usable as a retaining member for rotation shafts of other rollers such as the sheet feeding roller 12, the registration roller pair 13, etc.

Figure 12:
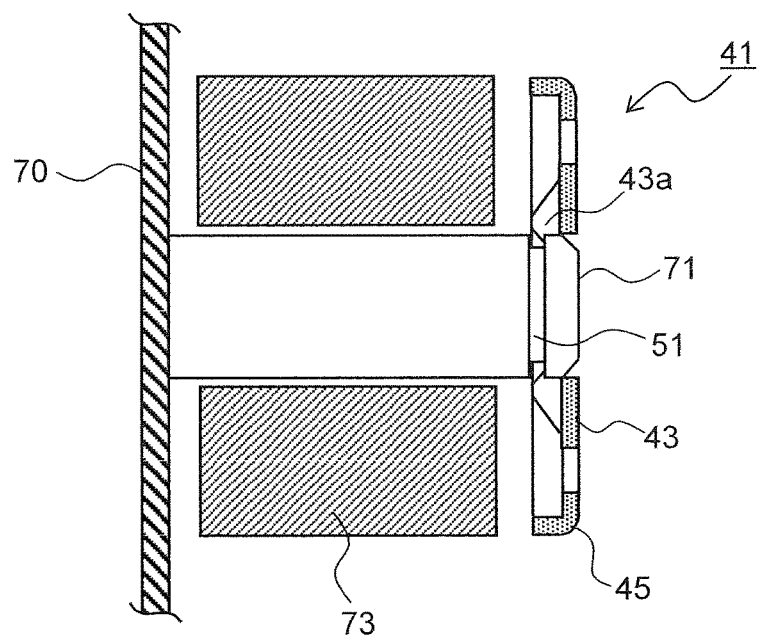
FIG. 12 is a diagram showing an example in which a retaining member of the present disclosure is used as a retaining mechanism for an idle gear mounted on a fixed shaft which is fixed to a frame.

Or, as shown in FIG. 12, in a case where an idle gear 73 is mounted on a fixed shaft 71 fixed on a frame 70, the retaining member 41 can be used as a retaining member for the idle gear 73 by forming an engagement groove 51 in the fixed shaft 71 for mounting the retaining member 41.

The present disclosure is usable in image forming apparatuses, such as copiers, printers, facsimile machines, and multifunction peripherals having functions of these. The use of the present disclosure provides a retaining member which can be mounted and dismounted with respect to a rotation shaft with easy operations and which is also capable of achieving space saving, and an image forming apparatus including such a retaining member.

What is claimed is:

1. A retaining member which is mounted on an end part of a shaft supported by a holding member, and prevents the shaft from coming off from the holding member or prevents a rotary body mounted around the shaft from coming off, the retaining member comprising:
   an inner circumferential portion which is ring-shaped and faces the end part of the shaft supported by the holding member;
   an outer circumferential portion which is ring-shaped and disposed outside the inner circumferential portion in a radial direction;
   a linkage portion which connects the inner circumferential portion and the outer circumferential portion to each other in the radial direction;
   a plurality of engagement claws which project from a surface of the inner circumferential portion pointing in a direction of the shaft, and engage with an engagement groove formed in an outer peripheral surface of the shaft; and
   a slit which is formed on a side opposite from the linkage portion with a center of the inner circumferential portion located between the slit and the linkage portion, and cuts the inner circumferential portion in the radial direction,
   wherein
   the retaining member is mounted onto the end part of the shaft by being pushed toward a surface of a tip end of the shaft in an axial direction of the shaft until the plurality of engagement claws reach a position of the engagement groove while the inner circumferential portion is elastically deformed, and
   the retaining member is integrally formed of an elastically deformable resin material.

2. The retaining member of claim 1,
   wherein
   the plurality of engagement claws are formed on the inner circumferential portion to be equally spaced from each other along a circumferential direction of the inner circumferential portion.

3. The retaining member of claim 1,
   wherein
   a rib is formed in a ring shape along an outer peripheral edge of the outer circumferential portion to project from a surface of the outer circumferential portion pointing in a direction of the shaft, and
   the rib contacts an end surface of the holding member in a state where the engagement claws are engaged in the engagement groove.

4. The retaining member of claim 1,
   wherein
   a recessed portion is formed in a surface of the linkage portion opposite to a surface of the linkage portion pointing in the direction of the shaft.

5. The retaining member of claim 1,
   wherein
   the linkage portion includes a handle portion formed to project from a surface of the linkage portion opposite to a surface of the linkage portion pointing in the direction of the shaft.

6. The retaining member of claim 1,
   wherein
   in a state where no external force is applied to the inner circumferential portion, a diameter of a circle passing through leading ends of the engagement claws is smaller than an outer diameter of the shaft.

7. An image forming apparatus comprising the retaining member of claim 1.

8. A retaining member which is mounted on an end part of a shaft supported by a holding member, and prevents the shaft from coming off from the holding member or prevents a rotary body mounted around the shaft from coming off, the retaining member comprising:
   an inner circumferential portion which is ring-shaped and faces the end part of the shaft supported by the holding member;
   an outer circumferential portion which is ring-shaped and disposed outside the inner circumferential portion in a radial direction;
   a linkage portion which connects the inner circumferential portion and the outer circumferential portion to each other in the radial direction;
   a plurality of engagement claws which project from a surface of the inner circumferential portion pointing in a direction of the shaft, and engage with an engagement groove formed in an outer peripheral surface of the shaft; and
   a slit which is formed on a side opposite from the linkage portion with a center of the inner circumferential portion located between the slit and the linkage portion, and cuts the inner circumferential portion in the radial direction,
   wherein
   the retaining member is integrally formed of an elastically deformable resin material,
   a rib is formed in a ring shape along an outer peripheral edge of the outer circumferential portion to project from a surface of the outer circumferential portion pointing in a direction of the shaft, and the rib contacts an end surface of the holding member in a state where the engagement claws are engaged in the engagement groove.

9. A retaining member which is mounted on an end part of a shaft supported by a holding member, and prevents the shaft from coming off from the holding member or prevents a rotary body mounted around the shaft from coming off, the retaining member comprising:
- an inner circumferential portion which is ring-shaped and faces the end part of the shaft supported by the holding member;
- an outer circumferential portion which is ring-shaped and disposed outside the inner circumferential portion in a radial direction;
- a linkage portion which connects the inner circumferential portion and the outer circumferential portion to each other in the radial direction;
- a plurality of engagement claws which project from a surface of the inner circumferential portion pointing in a direction of the shaft, and engage with an engagement groove formed in an outer peripheral surface of the shaft; and
- a slit which is formed on a side opposite from the linkage portion with a center of the inner circumferential portion located between the slit and the linkage portion, and cuts the inner circumferential portion in the radial direction, wherein
the retaining member is integrally formed of an elastically deformable resin material, and
a recessed portion is formed in a surface of the linkage portion opposite to a surface of the linkage portion pointing in the direction of the shaft.

10. A retaining member which is mounted on an end part of a shaft supported by a holding member, and prevents the shaft from coming off from the holding member or prevents a rotary body mounted around the shaft from coming off, the retaining member comprising:
- an inner circumferential portion which is ring-shaped and faces the end part of the shaft supported by the holding member;
- an outer circumferential portion which is ring-shaped and disposed outside the inner circumferential portion in a radial direction;
- a linkage portion which connects the inner circumferential portion and the outer circumferential portion to each other in the radial direction;
- a plurality of engagement claws which project from a surface of the inner circumferential portion pointing in a direction of the shaft, and engage with an engagement groove formed in an outer peripheral surface of the shaft; and
- a slit which is formed on a side opposite from the linkage portion with a center of the inner circumferential portion located between the slit and the linkage portion, and cuts the inner circumferential portion in the radial direction, wherein
the retaining member is integrally formed of an elastically deformable resin material, and
the linkage portion includes a handle portion formed to project from a surface of the linkage portion opposite to a surface of the linkage portion pointing in the direction of the shaft.

* * * * *